United States Patent [19]

Philp

[11] Patent Number: 4,603,318

[45] Date of Patent: Jul. 29, 1986

[54] TELEMETRY AND LIKE SIGNALING SYSTEMS

[76] Inventor: Robert J. Philp, 1 Rue J. P. Sauvage, 2514-Kirchberg, Luxembourg

[21] Appl. No.: 551,053

[22] Filed: Nov. 14, 1983

[51] Int. Cl.[4] .................... H04M 11/04; H08B 26/00

[52] U.S. Cl. ................................ 340/310 R; 340/505; 340/518

[58] Field of Search .................... 340/310 R, 505, 518, 340/825.06, 825, 825.16

[56] References Cited

U.S. PATENT DOCUMENTS

| | | | |
|---|---|---|---|
| 4,093,946 | 6/1978 | Fowler | 340/505 |
| 4,162,489 | 7/1979 | Thilo et al. | 340/518 |
| 4,206,449 | 6/1980 | Galvin et al. | 340/518 |
| 4,290,055 | 9/1981 | Furney et al. | 340/505 |
| 4,359,721 | 11/1982 | Galvin et al. | 340/505 |
| 4,385,287 | 5/1983 | Eatwell | 340/505 |
| 4,413,259 | 11/1983 | Lutz et al. | 340/518 |
| 4,491,828 | 1/1985 | Galvin et al. | 340/505 |

*Primary Examiner*—Douglas W. Olms
*Assistant Examiner*—Wellington Chin
*Attorney, Agent, or Firm*—Fulwider, Patton, Rieber, Lee & Utecht

[57] ABSTRACT

A system for sensing multiple conditions, such as alarm conditions, at each of a number of remote stations, the sensing being accomplished solely through a pair of power lines by means of which the remote stations are connected in a cascade arrangement with a central station. When power is applied to the first of the remote stations, a current pulse is drawn through the power lines and is modulated in accordance with a sensed condition at the remote station. At the end of the current pulse, there is at least one zero-current interval, the duration of which is varied in accordance with another sensed condition at the remote station. The central station, after applying power to the first remote station, identifies the sensed conditions from the modulated current pulses and the durations of the zero-current intervals. Each remote station also includes a line power switch that remains open until the completion of interrogation of the sensed conditions at that particular station. Then the line power switch is closed and power is transmitted to the next remote station in sequence. Additional features disclosed include the use of power for secondary purposes during zero-current intervals, the detection of cumulative sensor activity at a remote station, and a power-seeking line switch to permit remote stations to receive power from either direction.

23 Claims, 10 Drawing Figures

TELEMETRY AND LIKE SIGNALING SYSTEMS

BACKGROUND OF THE INVENTION

This invention relates generally to signaling systems in which a plurality of remote stations are connected to a central station by common signal transmission paths. More specifically, the invention relates to signaling systems of this type in which information from the remote stations is transmitted to the central station by time-division multiplexing use of a common signal transmission path. This is to be distinguished, of course, from a signaling system in which each of a plurality of remote stations is separately wired to a central station, such as in conventional security alarm systems.

The broad principle of employing cascaded switching devices to detect conditions at a plurality of remote locations is not new. In accordance with the principle, a stimulus currrent or voltage is applied by the central station to a string of switching devices, which respond sequentially in a predictable manner, unless an abnormal condition causes a different response to be generated and detected. British Pat. Nos. 1,027,726 and 1,001,083 describe apparatus that falls into the same category as this broad principle. The same principle is disclosed in Swiss Pat. No. 473 432, and in German Pat. Nos. 2638068, 2533382, 2533354, and 2635763. Gernam Specification 2638068 corresponds to U.S. Pat. No. 4,162,498.

U.S. Pat. Nos. 4,206,449 and 4,359,721 to Galvin et al. are examples of two-wire alarm systems, and the one described in U.S. Pat. No. 4,359,721 employs a cascading principle. Nevertheless, the Galvin system is not of the same type as the present invention, since each remote station in the Galvin system has to identify itself uniquely by the nature of its response. As will be explained in detail, the remote stations in the system of the invention are identical units and are identifiable only by their position in a string of remote stations.

Prior to this invention, the cascade principle as disclosed in the patent publications listed above had a number of shortcomings. First, as the number of remote stations is increased the cumulative current drawn by the stations in series becomes significantly large, and there is a significant voltage drop between the central station and the most remote station. Another disadvantage of cascade systems of the prior art is that it is possible to sense only one variable at each remote station, either by modulating the time or magnitude of a current pulse. These and other disadvantages of the prior art are overcome by the signaling system of the present invention.

SUMMARY OF THE INVENTION

The present invention resides in a signaling system including a central station and a plurality of remote stations connected to the central station in a cascaded relationship, such that power is applied sequentially to each remote station in turn, and such that at least two conditions may be sensed at each remote station. Briefly, and in general terms, the system of the invention comprises a central station and a plurality of remote stations connected in a cascaded relationship to the central station by a pair of conductors. Each of the remote stations includes means for modulating a current pulse in accordance with a first sensed condition, means for timing a zero-current interval in accordance with a second sensed condition, and switching means for transmitting power to the next remote station connected to the conductors.

More specifically, one illustrative embodiment of the invention has the ability to detect two sensed conditions at each remote station. When power is first applied to a remote station, a predetermined constant current is drawn from the central station for a pulse period that is dependent on the first sensed condition. Then, a zero-current condition is maintained for a time interval that depends on the second sensed condition, after which the switching means is actuated to transmit power to the next remote station in sequence. The central station includes means for resetting the remote stations to an initial state, means for applying power to a first of the remote stations, and means for detecting current pulses drawn by successive remote stations, and thereby detecting the sensed conditions at each of the remote stations.

In accordance with another aspect of the invention, the switching means at each remote station operates to transmit power to the next station in sequence only after the current pulse drawn by the present station has ceased. Thus, the current drawn from the central station does not accumulate significantly as successive stations are interrogated, since each station draws only a small standby current after interrogation.

Another feature of the invention is that, since there is at least one interval of zero current during interrogation of each remote station, the zero-current interval may be used to supply power for a secondary purpose at the remote station. To implement this feature, each remote station may further include bistable switching means responsive to a signal from the central station, to switch power to a secondary function, such as for monitoring additional transducers, or for diverting line voltage to a secondary or branch line of remote stations.

In accordance with another feature of the invention, each remote station may further include transducer memory means, whereby a temporary or cumulative condition sensed between interrogations will be stored or accumulated for detection during interrogation of the remote station. For example, the transducer memory means may include a capacitor that is charged upon the occurrence of a sensed event, the voltage or charge of the capacitor being subsequently employed to modulate a response to interrogation from the central station.

Yet another feature of the invention is the ability of one disclosed embodiment to connect to power in either direction along the cascaded chain of remote stations. If there should be a failure of one remote station to transmit power to the next station in sequence, this feature provides the ability to transmit power to remaining remote stations, by transmitting power from the opposite end of the chain. For this purpose, each of the switching means at the remote stations may include power-seeking switch means, with the ability to connect the station to a power signal from either direction.

It will be appreciated from the foregoing that the present invention represents a significicant advance in the field of remote detection and transmission of information. In particular, the invention provides a system in which more than one sensed condition may be detected and transmitted from each of a plurality of remote stations, and in which cumulative line currents and voltage drops are minimized. In addition, alternative embodiments of the invention provide for employing line voltage for secondary purposes at each remote station, retaining a temporary or cumulative sensed condition in a memory device for later transmission, and employing a bidirectional power-seeking switch to allow cascading in both directions along a chain of remote stations. These and other aspects and advantages of the present invention will become apparent from the following more detailed description, taken in conjunction with the accompanying drawings.

DESCRIPTION OF THE PREFERRED EMBODIMENTS

Figure 1:
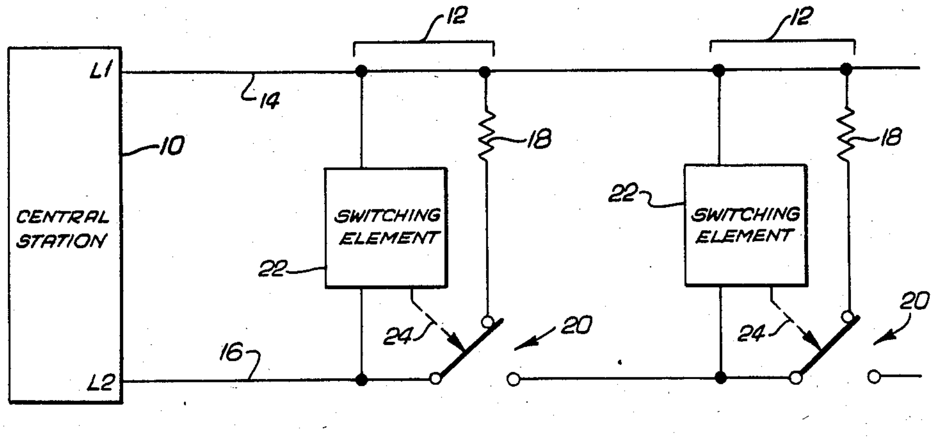
FIG. 1 is a block diagram of a signaling system illustrating the basic principle of the invention.

As shown in the drawings for purposes of illustrations, the present invention is concerned with signaling systems for the collection of information from remote sites. Such systems may be, for example, security monitoring systems in which a number of remote sites or zones are monitored at a central location to detect unauthorized access to premises, fire, or other conditions. The invention is not limited to the security field, however, and may be applied, for example, to monitoring and control of industrial processes, monitoring of automobile performance, or energy usage monitoring and management in buildings.

As shown in FIG. 1, the basic configuration of the invention includes a central station, indicated by reference numeral 10, and a plurality of remote stations 12 connected to the central station by a single pair of power supply lines 14 and 16. Each of the remote stations 12 includes a resistor 18, the resistance value of which may depend upon a sensed condition at the remote site, a line switch 20 in one of the power supply lines 16, and a switching element 22 connected to the power supply lines and asserting control over the line switch, as indicated by the broken line 24. The resistor 18 is connected between the upper power supply line 14 and one pole of the line switch 20, so that one position of the switch connects the resistor across the power supply lines. The other position of the switch 20 disconnects the resistor 18 and applies power to the next of the remote stations 12.

As will be discussed in detail, the switching element 22 operates to disconnect the resistor 18 from the power supply lines before switching power to the next remote station 12. This aspect of the switch operation has two important consequences. First, there will be a time interval during which no current will be drawn along the power supply lines. This zero-current interval is, in accordance with one aspect of the invention, employed to convey a sensed condition at the remote site. The other consequence is that the current drawn by successive remote stations 12 will not be cumulative, except for small amounts of standby current drawn by the switching elements 22. FIG. 1 is a simplified diagram not intended to show the complexities of operation of a remote station, but it will become clear that the switching elements 22 may also operate in response to multiple sensed conditions at the remote stations.

Figure 2:
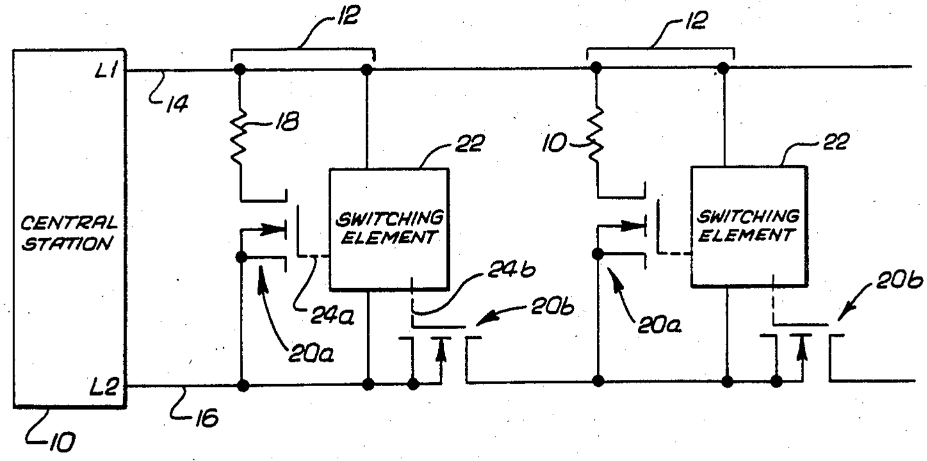
FIG. 2 is a block diagram similar to FIG. 1 but showing the switching arrangement in more detail.

FIG. 2 illustrates the system of FIG. 1 in which the line switch 20 has been replaced by two field-effect transistors **20*a* and 20*b*. Both of the transistors 20*a* and 20*b*, are controlled by the switching element 22, as indicated by broken lines 24*a* and 24*b*. Transistor switch 20*a* is connected between the resistor 18 and power line 16, and transistor switch 20*b* is connected in the line 16, like the line switch 20 in FIG. 1. In operation, the switching element 22 first disconnects the resistor 18 by opening transistor switch 20*a*, and then closes the line switch 20*b* to apply power to the next remote station 12** in sequence.

The improved construction of FIG. 2 further reduces the cumulative voltage drop associated with systems of this type by employing a field-effect transistor (FET) switch type known as CMOS (complementary metal-oxide-semiconductor) or DMOS (double-diffused metal-oxide-semiconductor). FET's of this type have a relatively low resistance in the "on" condition and a minimal holding current.

An important feature of the invention is that the line current is reduced to zero before switching power to the next remote station in sequence. This feature, which is illustrated in the current-time waveform of FIG. 3, permits a number of useful functions to be performed during the zero-current or off-load pulse intervals. During time interval $t_0$, a reset operation takes place. A reduced line voltage from the central station 10 causes all of the switching elements 22 to assume an original and non-stimulated state, in which each of the line switches **20*b* is open. At the beginning of interval $t_1$, the line voltage supplied by the central station 10** is raised, and is sustained until the next reset operation.

The even-numbered time intervals, $t_2$, $t_4$, $t_6$, $t_8$ and $t_{10}$, are the zero-current intervals that occur in an interrogation cycle. The time of each zero-current interval may be usefully employed to convey information to the central station 10. For example, intervals $t_2$ and $t_8$ may be recognized at the central station as normal-length pulse intervals indicative of a normal condition at the remote stations. On the other hand, intervals $t_4$ and $t_6$ are wider and narrower, respectively, than the other zero-current intervals, and may be recognized at the central station as indicating abnormal conditions.

Similarly, the current pulses in intervals $t_1$ and $t_5$ may be interpreted as indicative of normal conditions, while pulse interval $t_3$ may be indicative of an abnormal condition because of its relatively long time duration. The odd-numbered intervals, referring to non-zero current pulses, may be modulated either in duration or in amplitude to convey information to the central station 10. Pulse intervals $t_7$ and $t_9$ are examples of amplitude-modulated pulses. Pulse interval $t_{10}$ is shown as of indefinite length, and may be indicative of a line interruption or a line switch fault at the location corresponding to this pulse interval.

Figure 3:
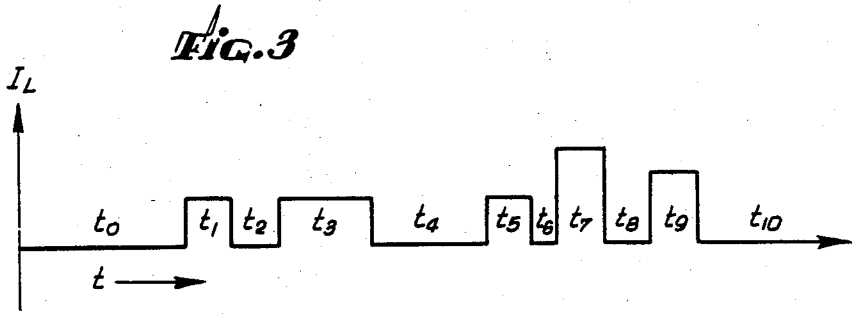
FIG. 3 is a typical timing diagram showing the variation of line current during an interrogation sequence in accordance with the invention.

In the simplest embodiment of the invention, such as is illustrated in FIGS. 1 and 2, each pair of time intervals shown in FIG. 3 will correspond to one remote station 12. When power is first applied to a remote station, a current pulse will result, and then a zero-current interval will follow prior to switching power to the next station in sequence. In a more generalized embodiment of the invention, each remote station 12 may generate multiple current pulses separated by zero-current intervals. This feature is shown in FIG. 4.

Figure 4:
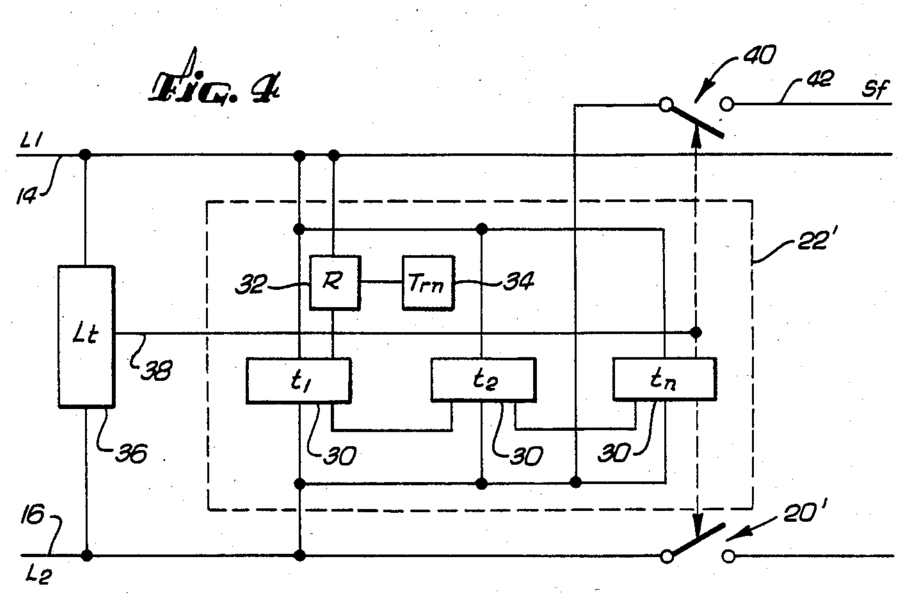
FIG. 4 is a block diagram showing a more complex switching structure at a remote station.

As shown in FIG. 4, a switching element 22' may include a plurality of timing and loading elements 30 connected across the power supply lines 14 and 16 and connected to each other in a cascade arrangement. Each of the timing and loading elements may have a resistor 32 associated with it, and be modulated by a transducer element 34, such that the duration or amplitude of a current pulse is modulated in accordance with a sensed variable quantity that effects a change in the transducer. Thus, when power is first applied to the remote station, the timing and loading elements 30, operating in conjunction with the transducers 34, generate a train of current pulses separated by zero-current or off-load pulse intervals, similar to those shown in the waveform of FIG. 3. The last of the timing and loading elements 30 is coupled to the line switch 20' in power line 16, to enable switching to the next remote station in sequence.

The embodiment shown in FIG. 4 also includes a bistable latch 36 connected to the power lines 14 and 16 and providing a control output on line 38. The bistable latch 36 can be operated by an appropriate signal from the central staion 10, such as a line-current weakening or intensifying pulse. The control signal on line 38 can be used to operate another power switch 40, which is connected to divert power from line 16 to energize a supplementary power line 42. The purpose of the supplementary power line 42 is to provide power, during a non-load or zero-current interval, for various extraneous functions, such as monitoring other line switches or transducers, or diverting line voltage to a branch line of remote stations, not shown in the drawings. Of course the additional power switch 40 should be selected to employ a technology that draws minimal operating current.

Figure 5:
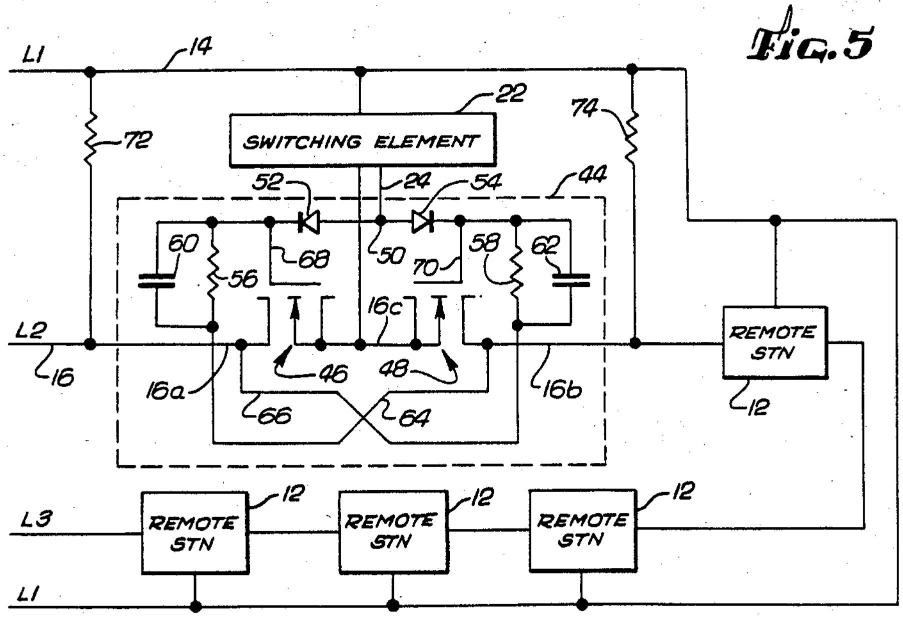
FIG. 5 is a block diagram illustrating the use of a power-seeking switch at each remote station.

One significant disadvantage of signaling systems of the type described is that a fault in a remote unit may render inoperative all remote units connected further along the cascade string of such units. In the worst case, a fault in the first remote unit in the string can render the entire system inoperative. The configuration of FIG. 5 provides a solution to this difficulty, by including a bi-directional, power-seeking line switch 44 coupled to the lower power line 16. The switch 44 includes two FET switches 46 and 48, connected to the line 16 in a symmetrical or back-to-back arrangement, with switch 46 connecting a central portion 16*c* of the line to a portion 16*a* of the line on one side of the switch 44, and switch 48 conecting the central portion 16*c* to a portion 16*b* on the other side of the switch 44. A switching element 22 is connected between line 14 and the central portion 16*c* of line 16, and provides a switching control signal on line 24 to the switch 44.

The control signal line 24 from the switching element 22 is connected to a junction point 50 in the switch 44, and this junction point is cross-connected to the power lines 16*a* and 16*b*, through two diodes 52 and 54, two resistors 56 and 58, and two capacitors 60 and 62. One connection path is from the junction point 50 through diode 52, through resistor 56 and capacitor 60 in parallel, and over line 64 to line 16*b*. The other connection path is from junction point 50 through diode 54, through resistor 58 and capacitor 62 in parallel, and over line 66 to line 16*a*. The control signal for the activation of switch 46, which is connected to line 16*a*, is derived, as indicated at 68, from the cathode side of diode 52, the anode side being connected to junction 50. Likewise, as indicated at 70, the control signal for switch 48, which is connected to line 16*b*, is derived from the cathode side of diode 54, the anode side being connected to the junction point 50.

Completing the arrangement are a resistor 72 between power line 14 and line 16*a*, and a similar resistor 74 between power line 14 and line 16*b*. The switching element 22 takes its more negative power supply from the central portion 16*c* of the power line 16.

The switches 46 and 48, which are VMOS-type FET's, in the "off" state are equivalent to two diodes connected back-to-back. In the "on" state, the switches 46 and 48 are equivalent to two resistors in series. Initial ground voltage from either the 16*a* or the 16*b* side, finds a path to junction 16*c* via the diode equivalent of "off" state FET 46 or 48. Thus, the switching element 22 receives ground voltage supply regardless of the switched state of the FETs, and will satisfactorily control the switches 46 and 48 with line 24 connected directly to lines 68 and 70 (not shown). However, system arrangements which include optional control signals from central statin 10 (as described with reference to FIG. 4, reuire the supply-side switch 46 or 48 to be in the "on" state while this remote station is being interrogated. Otherwise, such control signals will be blocked. To meet this requirement, cross-connected capacitors and resistors are added as previously described. Initial ground voltage at, for example, 16*a*, switches "off" FET 48 via capacitance 62. This leaves positive voltage from line 14 via resistance 74 to hold FET 46 in the "on" state during interrogation. Both of these control levels are overidden by the eventual control positive voltage output of switching element 22 via line 24 and the diodes 52 and 54. Resistors 56 and 58 provide discharge paths for their respective capacitors 60 and 62 during system reset periods.

Figure 6:
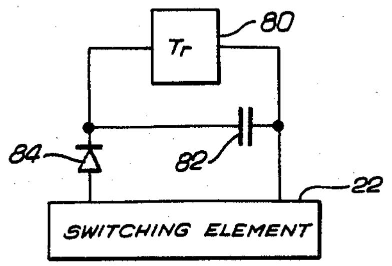
FIG. 6 is a block diagram of a transducer memory device for use at a remote station.

FIG. 6 illustrates another aspect of the invention, whereby a switching element 22 and a transducer 80 are used in conjunction with a capacitor 82 and a diode 84, to provide the transducer circuit with a cumulative memory capability. In the signaling system of the invention, each remote station is interrogated during a relatively short period of time in each interrogation cycle. For some transducer functions, there may be activity between interrogations that would normally be undetectable by the system, or it may be desired to interrogate accumulated transducer activity, occurring during interrogation and non-inerrogation periods.

In the illustrative embodiment of this feature of the invention, the capacitor 82 is charged through the diode 84 during each interrogation period. At all other times, the capacitor 82 is discharged through the transducer 80, at a rate that is modulated by the state of the transducer. Thus, the charge remaining in the capacitor 82 reflects the accumulated transducer activity since the last time that the capacitor was fully charged. At the next charging time of the capacitor 82, the level of discharge is used to modulate the line current pulse duration or intensity, or both. This modulated line current is sensed at the central station 10, and may be used to compute the accumulated transducer activity at the remote site. One useful application of this technique is in vibration sensing transducers, which may be used to sense intrusion by monitoring the accumulated transducer activity. Without this feature of the invention, vibration sensor activity between interrogation periods would go completely undetected.

Figure 7:
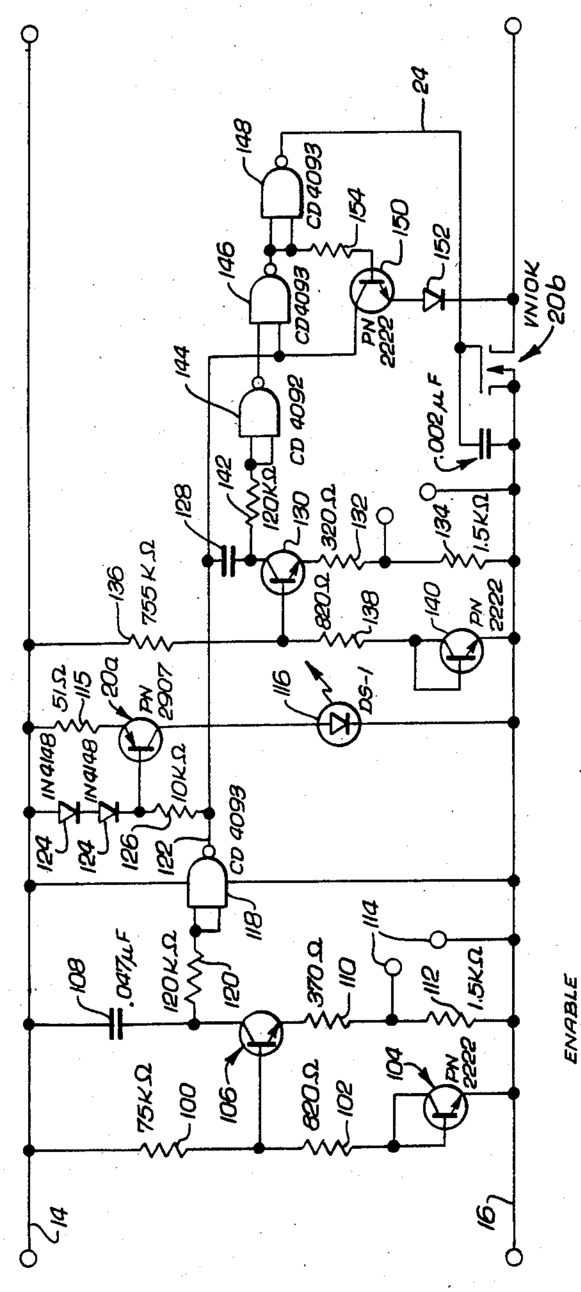
FIG. 7 is a schematic diagram of a specific embodiment of a remote station.

FIG. 7 illustrates a more detailed embodiment of a remote station used in the system of the invention. The remote station embodies the same principles discussed in relation to FIGS. 1 and 2. Power is supplied on lines 14 and 16, and FET 20*b* is connected in line 16 to switch power to the next remote station in sequence. A PNP bipolar transistor is referred to by numeral 20*a,* since it serves basically the same purpose as the switch bearing that numeral in FIG. 2. At the left-hand side of the figure is a voltage divider circuit comprising resistors 100 and 102 and an NPN transistor 104 connected as a diode, all three components being connected in series across the power lines 14 and 16. A reference voltage is derived from the junction of the two resistors 100 and 102, and is applied to the base terminal of another NPN transistor 106. The latter transistor is part of a constant-current circuit and has its collector coupled to power line 14 through a timing capacitor 108, and its emitter coupled to power line 16 through resistors 110 and 112 connected in series. This transistor circuit charges the timing capacitor 108 at a constant-current rate when power is first applied to the station, and is used to define the duration of a first current pulse drawn by the station. As indicated by the connectors 114 at the ends of resistor 112, the value of this resistor is modulated by a connected transducer (not shown). In the simplest case, the transducer action either opens or shorts the contacts 114, resulting in the use of a different time constant in the circuit for charging the capacitor 108.

The current drawn by the station when first interrogated flows from power line 14 through a resistor 114, through the PNP transistor 20*a* and through a series-connected light-emitting diode (LED) 116 to the other power line 16. The PNP transistor 20*a* has its base terminal coupled to the timing circuit in the following manner. A Schmitt trigger NAND gate 118 has its inputs coupled to the collector terminal of NPN transistor 106 in the timing circuit, through a resistor 120, and provides an output on line 122. The base terminal circuit of PNP transistor 20*a* includes a pair of diodes 124 connected in series between the power line 14 and the base terminal, and a resistor 126 connected between the base terminal and the output of NAND gate 118 on line 122.

The output voltage level on line 122 is initially at a low level when power is first applied to the circuit. In this state, current flowing through the diodes 124 and the resistor 126 present a bias to the base of the PNP transisitor 20*a* and hold in an "on" condition. A constant current therefore flows through the transistor 20*a* and the LED 116. This is the on-load current pulse drawn by the station. As the timing capacitor 108 is charged, the voltage applied to the inputs of the NAND gate 118 falls. When a preselected threshold is reached, the NAND gate 118 is triggered and its output on line 122 goes to a high level, thereby terminating the current pulse through the LED 116. After the NAND gate has been triggered, the PNP transistor 20*a* is turned off and no current flows through the LED 116.

Connected between line 122 and power line 16 is another timing circuit comprising a timing capacitor 128, and NPN transistor 130 and two resistors 132 and 134, these components being connected identically to the timing circuit including transistor 106. The base terminal bias for the transistor 130 is derived from a voltage divider circuit comprising two resisotrs 136 and 138 and a transistor 140 connected as a diode, these components being identical to those in the voltage divider having resistors 100 and 102.

As soon as the on-load current pulse has ended, as indicated by a high level voltage on line 122, the second timing circuit is activated, and timing capacitor 128 is charged. One terminal of the capacitor 128 is coupled through a resistor 142 to the input of another NAND gate 144 similar to the gate 118. Thus, when the voltage across the timing capacitor 128 increases to a predetermined level, the NAND gate is triggered to provide a high-level ouput. This output and the signal on line 122 are logically ANDed together in another NAND gate 146, the output of which is inverted in yet another NAND gate 148, and then applied over line 24 to actuate the switch 20*b* and apply power to the next station in sequence.

The second timing circuit, controlling the duration of an off-load or zero-current interval, is determined in part by a second transistor (not shown) connected across resistor 134 to modulate its value in some manner. Again, in the simplest case the transducer would either open or close contacts to which the terminals of the resistor 134 are connected, varying the charging time of the timing capacitor 128 accordingly.

The only portion of the station circuit still to be described includes another NPN transistor 150, which has its collector terminal connected to line 122, its emitter terminal connected through a diode 152 to the outgoing line 16, and its base terminal coupled to the output of NAND gate 146 through a resistor 154. The purpose of this circuit is to obviate a problem that might arise in the event that the switch 20*b* should malfunction and remain in the closed condition after its previous operation. This action would result in power being applied to the next remote station prematurely, and would also result in the generation of current pulses in more than one station at a time. The transistor 150 handles this situation as follows. When line 122 is high, at the end of an on-load current pulse for this station, transistor 150 senses whether outgoing line 16 is already grounded, presumably by the unwanted closure of switch 20*b*. If the line 16 is grounded, transistor 150 effectively shorts line 122 to ground, and thereby turns on transistor 20*a*. This results in a current pulse of indefinite duration, which is sensed at the central site to provide an indication of trouble at the station.

The function of the central station 10 (FIG. 1) is to initiate iterrogation cycles of the remote stations, and to monitor the variation in current on the lines 14 and 16. It will be seen that the central station does not control or poll the stations, except in the limited sense of its initiation of an interrogation sequence upon the determination that a previous one has been completed. After initiation of an interrogation sequence, the function of the central station is basically a passive one, monitoring the amplitude, duration and number of current pulses and off-load or zero-current intervals. These central-station functions could be implemented in a variety of ways, all of which would be within the intended scope of the invention. However, one of the most convenient modes of implementation of the central station is the one illustrated here, employing a programmed microprocessor to perform the central-station functions.

The central station includes a microprocessor 160, such as part number 8784, manufactured by Intel Corporation and others. Connected to the microprocessor are a power supply 162, a conventional crystal clock 164, a set of manually operated station count switches 166, an input circuit 168 through which power line 14 is connected to the microprocessor, an output circuit 170 through which power line 16 is connected, a two-digit zone number display device 172, a set of control switches 174, an alarm relay 176, and a set of indicator lights 178.

Power to line 14 is derived from a +10 volt source indicated at 180, and is coupled to line 14 through a resistor 182. In the illustrative embodiment of the invention, when an on-load current pulse is drawn from the line 14 the voltage drop across the resistor 182 is approximately one volt, so that the voltage level on the line 14 is then approximately +9 volts when the current pulse is flowing. Thus, current pulses in the line 14 are detectable in the input circuit 168 as voltage level changes between +10 volts and +9 volts. These level charges ae capacitively coupled, through capacitor 184, to an operational amplifier 186, the output of which is transmitted to an input of a comparator 188. The comparator has a reference voltage applied to its other input, as indicated at 190, and has its output connected over line 192 to an input terminal of the microprocessor 160. The resultant signal on line 192 has a rectangular waveform varying between zero and +5 volts, the latter level being maintained by a +5 volt power supply connection 194 connected to line 192 through a resistor 196.

Connection to the normally grounded power line 16 is made through the circuit 170, which includes an NPN transistor 200, a PNP transistor 202 an FET switching transistor 204 and two resistors 206 and 208. Transistor 202 has its base terminal connected to a +10 volt power supply through resistors 206 and 208, has its emitter connected to a reference voltage, designated AREF in the drawing, and has its collector connected to the outgoing power line 16. The NPN transistor 200 has its base coupled to receive an output signal on line 210 from the microprocessor 160, has its emitter grounded, and has its collector connected to the power supply through the junction of the two resistors 206 and 208. The FET 204 is connected between the power line 16 and ground, and is controlled by the voltage level at the junction between the two resistors 206 and 208.

At the end of an interrogation cycle, a reset pulse is generated on line 210 from the microprocessor 160, placing transistor 200 in a conductive state and pulling the voltage at the junction of the two resistors 206 and 208 to practically ground level, to open the FET switch 204. A positive voltage level is thereby impressed on the normally grounded power line 16 during the reset pulse. When the reset pulse ends, the level at the junction of the two resistors 206 and 208 rises again and the FET switch 204 returns to a conductive state, grounding the power line 16 for the duration of the interrogation cycle. During the reset pulse, the remote stations 12 are all reset to their initial condition, with their FET line switches **20*b*** open and timing capacitors discharged.

The station count switches 166 are set to the number of remote stations currently in the system, and are used by the microprocessor 160 to determine when all stations have been interrogated, or should have been interrogated. An alternative approach would be to connect a terminating impedance (not shown) to the end of the chain of remote stations, such that, after the last station was interrogated, the impedance would be connected across the line, and detected at the central station in the form of a predetermined line current of indefinite duration. In the illustrative embodiment, however, the station count switches 166 are used for termination of the interrogation cycle.

Figure 9A:
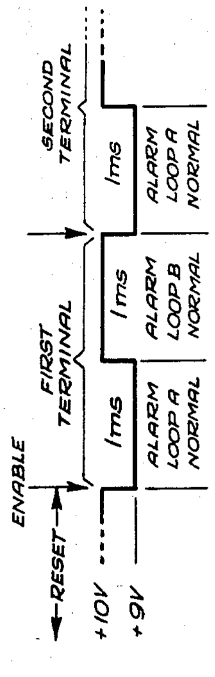
FIGS. 9*a* and 9*b* are timing diagrams showing a line voltage waveform resulting from typical variations in line current during operation of a system including the remote and central stations shown in FIGS. 7 and 8.
Figure 9B:
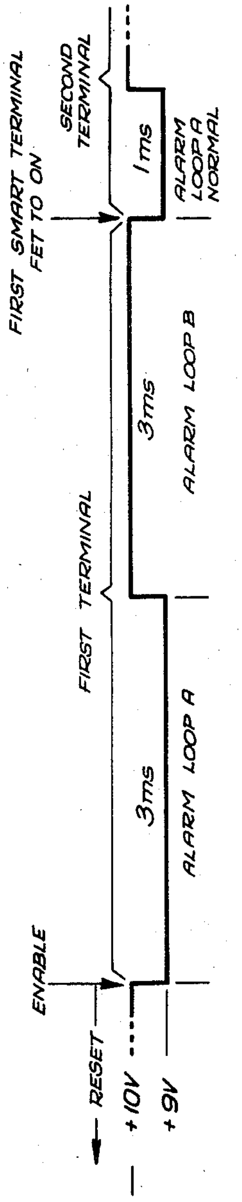
Figure 8:
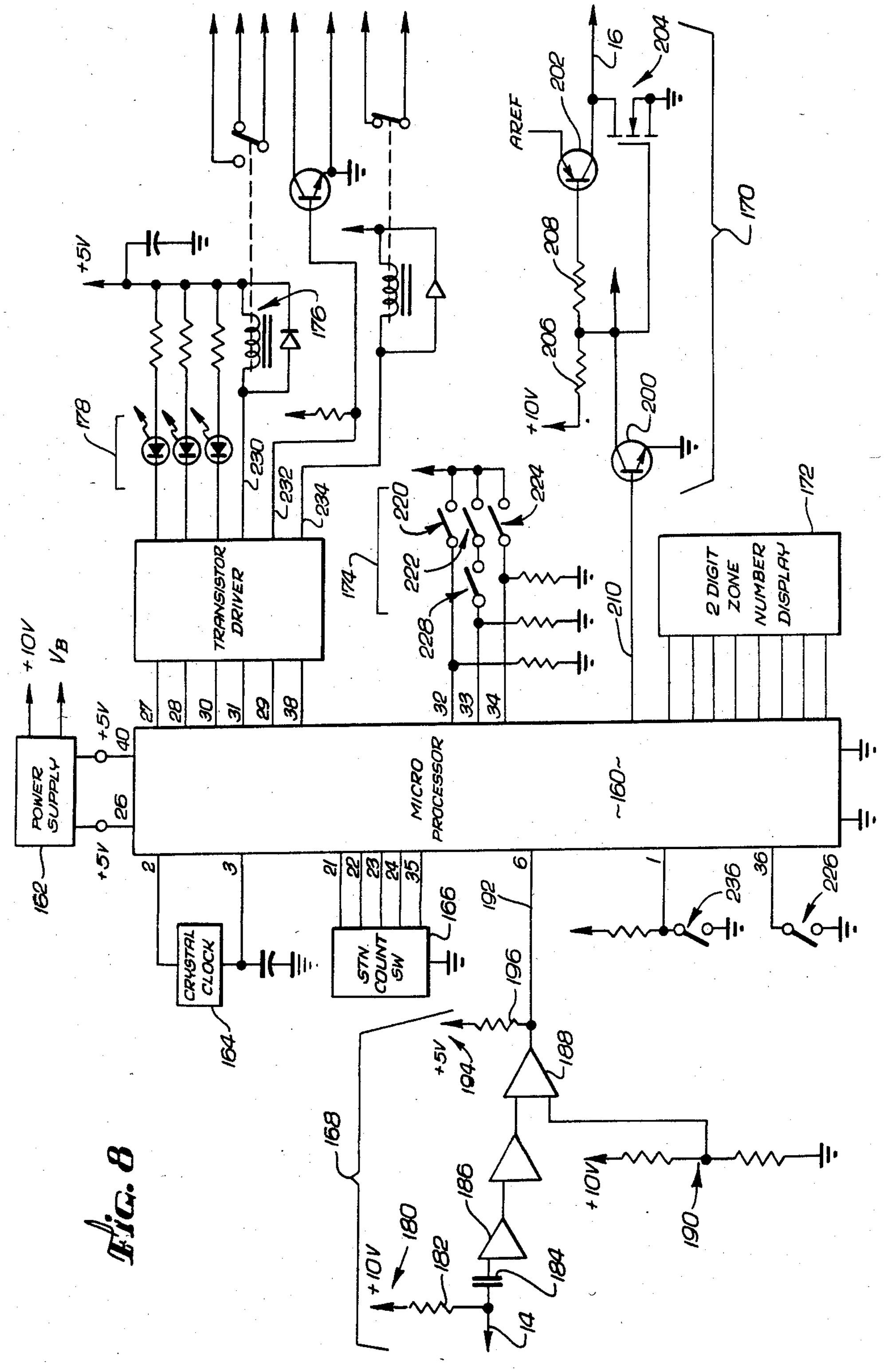
FIG. 8 is a schematic diagram of a central station for use with remote stations of the type shown in FIG. 7.

FIG. **9*a* shows the waveform of the voltage on power line 14 at the beginning of a typical interrogation cycle. The voltage is initially at +10 volts during the reset pulse; then falls to +9 volts for a one-millisecond on-load pulse if the first of two alarm sensors at the first remote station is in normal condition; and then rises again for a one-millisecond off-load interval, again assuming that the condition of the second sensor at the first remote station is normal. This cycle of one-millisecond pulses will continue so long as the sensed conditions at the remote stations are normal. FIG. 9*b*** shows by way of contrast the effect of an alarm condition at both sensors of the first remote station. Both the on-load pulse and the off-load interval are increased in duration to approximately three milliseconds.

The principal functions of the microprocessor 160 are to monitor the voltage waveform of the signal on line 14, as input on line 192, to record the status of each remote sensor in a memory associated with the microprocessor, and to generate appropriate alarm indications and requested displays of the status of sensor conditions. These functions may be implemented in a variety of hard-wired embodiments, but implementation in microprocessor form represents one of the best approaches in terms of both cost and convenience. The microprocessor 160 is programmed to count pulses in the waveform on line 192, and to measure the pulse lengths to determine whether an alarm condition exists. The pulse count provides an indication of the position of the remote station being interrogated. An assembly-language program for performing these functions is disclosed by way of example in Appendix A accompanying this patent specification.

Other control switches associated with the central station 10 include a manual scan switch 220, a bypass switch 222 and a reset switch 224. The manual scan switch 220 is a momentary switch that functions to display the status of a remote sensor or zone on the LED status indicators 178. These three indicators show, respectively, whether the zone has an alarm condition, has been bypassed by operator action, or has a trouble condition associated with it. A trouble condition indicates that the microprocessor 160 has sensed an on-load pulse or an off-load interval of very long duration, which will usually be indicative of a malfunction of some kind.

If none of the indicators 178 is energized, the status of the zone whose number is displayed in the numerical display 172 is normal. Repeated actuation of the manual scan switch 220 causes the zone number displayed to increment sequentially, with the status of each displayed zone being shown in the indicators 178. Another operator switch 226 is used to select which of two possible manual scan modes is in effect. In one position of the switch 226, all zones are scanned by repeated actuation of the manual scan switch 220. In the other position of the switch 226, only non-normal zones are scanned, i.e. those that have an alarm or trouble condition associated with them. As will be seen, this switch 226 is useful in limiting operation of the bypass switch 224.

The bypass switch 224 permits the operator to effectively bypass operation of a selected alarm zone. This operation is performed by first actuating the manual scan switch 220 until a desired zone number is displayed in the numerical display 172, and then actuating the bypass switch 222. On subsequent manual scans, the bypassed zone will show as having been bypassed. If the control switch 226 is set to allow scanning of only non-normal zones, the bypass switch can be used only to bypass zones for which there is already an alarm condition, since normal zones cannot be manually scanned in this condition of the switch 226. There is also a bypass override switch 228, connected in series with the bypass switch 222. The purpose of the override switch 228 is to preclude all bypassing operations, usually for securing reasons. Another feature of the microcprocessor is that the alarm relay 176 is momentarily energized whenever a zone is bypassed. This is to call attention to the fact that a zone has been bypassed, and to prevent possible unauthorized bypassing of all zones in the system. The reset switch 224 is used to reset all bypass and alarm conditions in the system.

There are three ouput lines 230, 232 and 234 from the microprocessor 160, in addition to the outputs to the status indicators 178. Line 230 actuates the alarm relay 176 whenever an alarm condition is sensed by the microprocessor. On the occurrence of such an alarm condition, the display 172 will show the number of the alarm zone at which the condition was detected, and the alarm indicator 178 will be illuminated. A flashing alarm indicator will warn the operator that other zones also have alarm conditions, which can be scanned by means of the manual scan switch 220. Yet another operator switch 236 selects from two possible modes of operation of the alarm relay 178. When switch 236 is open, the alarm relay 178 is non-latching, i.e. when the alarm condition at the remote station is no longer present the alarm relay is de-energized automatically. When the switch 236 is closed, the alarm relay is in a latching mode, and will remain energized even when the alarm condition at the remote station is no longer present. In the latching mode, the alarm relay can be de-energized only by actuation of the reset switch 224.

Output lines 232 and 234, respectively, are used to provide external output signals to indicate that a zone has been bypassed and that there has been a detected trouble condition. Use of these signals will depend on the nature of the application of the system.

It will be appreciated form the foregoing that the present invention represents a significant advance in the field of telemetry systems in general, and alarm systems in particular. The invention provides for the monitoring of at least two remote sensors at each of a plurality of remote stations connected by a single pair of lines to a central station. It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. A signaling system for monitoring a plurality of conditions at each of a plurality of remote sites, said system comprising:

a central station;

a plurality of remote stations connected in a cascaded relationship to said central station by a single pair of power lines and adapted to receive electrical power from said central station, each of said remote stations including means for modulating a current pulse passing through said power lines, in accordance with a first sensed condition, means for varying the duration of a zero-current interval following said current pulse, in accordance with a second sensed condition, and switching means for selectively transmitting power to the next remote station connected to said power lines; and wherein said central station includes means for counting current pulses on said power lines, and means for determining the sensed conditions at the remote sites, from the modulated current pulses and the durations of the zero-current intervals.

2. A signaling system as set forth in claim 1, wherein:

said means for modulating a current pulse includes timing means responsive to said first sensed condition, for varying the duration of said current pulse drawn from said central station upon initial application of electrcal power from said central station to said remote station; and said switching means is responsive to said means for varying the duration of said zero-current interval, to apply power to the next remote station in sequence upon completion of said zero-current pulse.

3. A signaling system as set forth in claim 2, wherein:

said first sensed condition is a binary condition that results in one of two possible pulse lengths of the current pulse; and said second sensed condition is another binary condition that results in one of two possible durations of the zero-current interval.

4. A signaling system as set forth in claim 3, wherein said central station includes:

means for generating a reset signal on the power lines, to reset said remote stations to an initial state;

means for applying electrical power to a first of said remote stations via said power lines; and means for measuring the durations of successive current pulses and zero-current intervals in said power lines, and thereby interrogating the sensed conditions at said remote stations.

5. A signaling system as set forth in claim 1, wherein said means for determining the sensed conditions at the remote sites includes:

means for detecting and locating a line short-circuit condition, from the occurrence of an excessively long current pulse; and means for detecting and locating a line open-circuit condition, from the occurrence of an excessively long zero-current interval.

6. A signaling system as set forth in claim 1, wherein each of said remote stations further includes:

bistable switching means responsive to a signal from said central station, to switch electrical power from said power lines to meet a secondary function during zero-current intervals.

7. A signaling system as set forth in claim 1, wherein at least one of said remote stations further includes:

transducer memory means, for storing a cumulative sensed condition between successive interrogations from said central station.

8. A signaling system as set forth in claim 1, wherein each of said remote stations further includes:

power seeking switching means, with the ability to connect the remote station to a power signal from either direction in said power lines.

9. A signaling system for monitoring a plurality of conditions at each of a plurality of remote sites, said system comprising:

a central station;

a plurality of remote stations, each of which has at least two sensors associated with that station;

a pair of power supply lines extending from said central station through each of said remote stations in a cascade arrangement;

each of said remote stations including means for modulating a current pulse drawn through said power lines, in accordance with the condition of a first of said sensors, means for varying the duration of a zero-current interval following said current pulse, in accordance with the condition of a second of said sensors, switching means installed in one of said power lines, for transmitting power to the next remote station connected to said power lines, upon completion of said zero-current interval; and wherein said central station includes means for counting current pulses in said power lines, and means for determining the sensed conditions at the remote sites, from the modulated current pulses and the durations of the zero-current intervals.

10. A signaling system as set forth in claim 9, wherein:

said means for modulating a current pulse includes timing means responsive to said first sensed condition, for varying the duration of said current pulse drawn from said central station upon initial application of electrical power to said remote station; and said switching means is responsive to said means for varying the duration of said zero-current interval, to apply power to the next remote station in sequence upon completion of said zero-current interval.

11. A signaling system as set forth in claim 10, wherein:

said first sensed condition is a binary condition that results in one of two possible pulse lengths of the current pulse; and said second sensed condition is another binary condition that results in one of two possible durations of the zero-current interval.

12. A signaling system as set forth in claim 11, wherein said central station includes:

means for generating a reset signal on the power lines, to reset said remote stations to an initial state;

means for applying electrical power via said power lines to a first of said remote stations at the start of each interrogation cycle; and means for measuring the durations of successive current pulses and zero-current intervals in said power lines, and thereby interrogating the sensed conditions at said remote stations.

13. A signaling system as set forth in claim 9, wherein said means for determining the sensed conditions at the remote sites includes:

means for detecting and locating a line short-circuit condition, from the occurrence of an excessively long current pulse; and means for detecting and locating a line open-circuit condition, from the occurrence of an excessively long zero-current interval.

14. A signaling system as set forth in claim 9, wherein each of said remote stations further includes:

bistable switching means responsive to a signal from said central station, to switch electrical power from said power lines to meet a secondary function during zero-current intervals.

15. A signaling system as set forth in claim 9, wherein at least one of said remote stations further includes:

transducer memory means, for storing a cumulative sensed condition between successive interrogations from said central station.

16. A signaling system as set forth in claim 9, wherein each of said remote stations further includes:

power-seeking switching means, with the ability to connect the remote station to a power signal from either direction in said power lines.

17. For use in a signaling system having a central station and a single pair of power supply lines extending from the central station to connect remote stations in a cascade arrangement, a remote signaling station comprising:

means responsive to the application of electrical power, for drawing a current pulse from said power lines;

means responsive to a first sensed condition for modulating said current pulse in accordance with said first sensed condition;

timing means activated in response to termination of said current pulse, and responsive to a second sensed condition, for timing a zero-current interval in accordance with said second sensed condition; and line switching means operable only at the end of said zero-current interval, for switching power to the next of said remote stations in sequence.

18. A remote signaling station as set forth in claim 17 wherein:

said means for modulating said current pulse includes timing means responsive to said first sensed condition, for varying the duration of said current pulse drawn from said central station upon initial application of electrical power to said remote station; and said switching means is responsive to said means for varying the duration of said zero-current interval, to apply electrical power to the next remote station in sequence upon completion of said zero-current pulse.

19. A remote signaling station as set forth in claim 18, wherein:

said first sensed condition is a binary condition that results in one of two possible pulse lengths of said current pulse; and said second sensed condition is another binary condition that results in one of two possible durations of said zero-current interval.

20. A remote signaling station as set forth in claim 19, and further including means responsive to a reset signal on said power lines, for resettting said signaling station to an initial condition.

21. A remote signaling station as set forth in claim 17, and further including:

bistable switching means responsive to a signal on said power lines, to switch electrical power from said power supply lines to perform a secondary function during zero-current intervals.

22. A remote signaling station as set forth in claim 17, and further including:

transducer memory means, for storing a cumulative sensed condition between successive interrogations.

23. A remote signaling station as set forth in claim 17, and further including:

power-seeking switching means, for selectively connecting said remote station to a power signal from either direction in said power lines.

* * * * *

UNITED STATES PATENT AND TRADEMARK OFFICE
CERTIFICATE OF CORRECTION

PATENT NO. : 4,603,318

DATED : July 29, 1986

INVENTOR(S) : Robert J. Philp

It is certified that error appears in the above-identified patent and that said Letters Patent is hereby corrected as shown below:

Column 1, line 23, delete "currrent" and insert therefor --current--.

Column 1, line 27, delete "Gernam" and insert therefor --German--.

Column 1, line 29, delete "4,162,498 and insert therefor --4,162,489--.

Column 1, line 32, delete "employes" and insert therefor --employs--.

Column 2, line 60, delete "significicant" and insert therefor --significant--.

Column 3, line 36, delete "illustrations" and insert therefor --illustration--.

Column 5, line 61, delete "conecting" and insert therefor --connecting--.

Column 6, line 33, delete "statin" and insert therefor --station--.

Column 6, line 34, delete "reuire" and insert therefor --require--.

Column 8, line 9, delete "resisotrs" and insert therefor --resistors--.

Column 8, line 59, delete "iterrogation" and insert therefor --interrogation--.

UNITED STATES PATENT AND TRADEMARK OFFICE
CERTIFICATE OF CORRECTION

PATENT NO. : 4,603,318

DATED : July 29, 1986

INVENTOR(S) : Robert J. Philp

It is certified that error appears in the above-identified patent and that said Letters Patent is hereby corrected as shown below:

Column 12, line 29, delete "electrcal" and insert therefor --electrical--.

Signed and Sealed this

Third Day of January, 1989

*Attest:*

DONALD J. QUIGG

*Attesting Officer*

*Commissioner of Patents and Trademarks*